United States Patent [19]

Billman et al.

[11] Patent Number: 4,978,822

[45] Date of Patent: Dec. 18, 1990

[54] SWITCH FOR INTEGRATED CIRCUIT PACKAGE

[75] Inventors: Timothy B. Billman, King; Roger L. Thrush, Clemmons, both of N.C.

[73] Assignee: AMP Incorporated, Harrisburg, Pa.

[21] Appl. No.: 421,308

[22] Filed: Oct. 12, 1989

Related U.S. Application Data

[63] Continuation of Ser. No. 179,602, Apr. 11, 1988, abandoned.

[51] Int. Cl.⁵ ............................................. H01H 9/04
[52] U.S. Cl. ............................................. 200/302.1
[58] Field of Search ........... 200/547, 548, 550, 302.1, 200/16 D; 361/332; 220/3.8; 174/50.57, 50.58

[56] References Cited

U.S. PATENT DOCUMENTS

| | | | |
|---|---|---|---|
| 4,454,391 | 6/1984 | Olsson | 200/16 D |
| 4,529,851 | 7/1985 | Priebe et al. | 200/548 |
| 4,620,061 | 10/1986 | Appleton | 220/3.8 |
| 4,628,166 | 12/1986 | Bingo et al. | 200/302.1 |
| 4,658,101 | 4/1987 | Akimoto et al. | 200/548 |

Primary Examiner—Renee S. Luebke
Attorney, Agent, or Firm—Eric G. Groen; Allan B. Osborne

[57] ABSTRACT

A printed circuit board mountable switch includes a insulative body having a plurality of leads extending out of the body, the leads being formed into two parallel and opposed rows with fixed ends of the leads being spaced apart and facing each other on the floor of the body. A slide switch element includes a bow shaped element having first and second contact elements adjacent to respective first and second fixed ends of the leads. The switch element is moveable between a first position where the switch element bridges between the associated first and second lead fixed ends, to a position where the second contact portion only, is in contact with the second fixed end of the lead. A cover is inserted over the housing which encloses the assembly. The cover includes a lip which extends downwardly into a peripheral channel of the housing. The cover and housing are ultrasonically welded together and the tip of the cover melts and flows within the channel but is prevented from flowing into the switch housing.

1 Claim, 10 Drawing Sheets

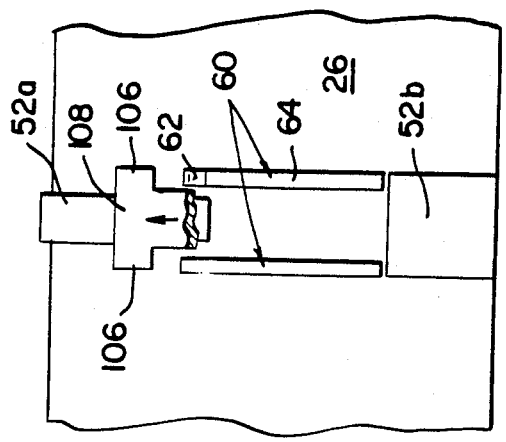
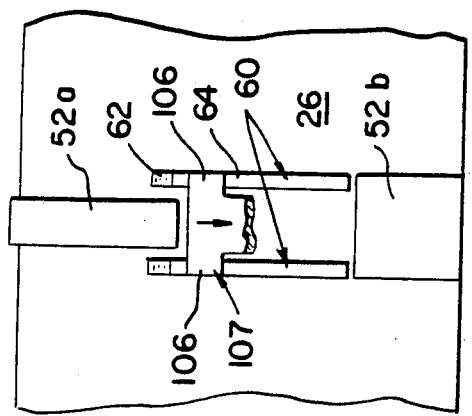

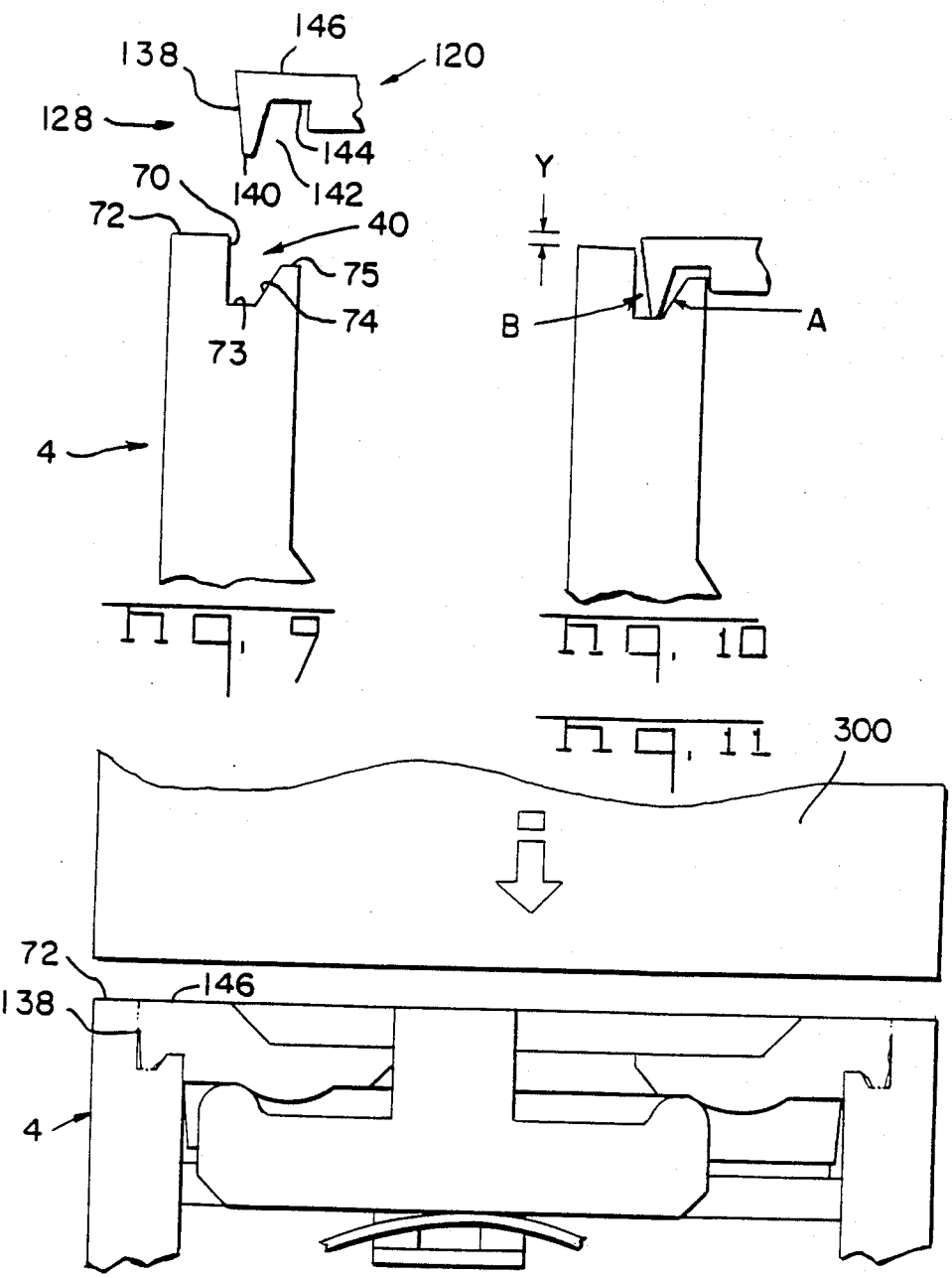

SWITCH FOR INTEGRATED CIRCUIT PACKAGE

This application is a continuation of application Ser. No. 07/179,602 filed Apr. 11, 1988, now abandoned.

BACKGROUND OF THE INVENTION

1. Field of the Invention

The subject invention relates to a switch for mounting to a printed circuit board which is configured as a dual inline package.

2. Description of the Prior Art

Switches configured as dual inline packages (DIP switches) are utilized within electronic equipment to change the configuration of the equipment. For example, DIP switches are typically found on items such as mother boards within computers or on expansion cards or auxiliary cards which mount within the computer. The switches allow easy changes in configuration in the system, for example, the configuration of a system can be varied to change the output location or printer or plotter model by merely changing the switch settings.

The DIP switches can either be installed and soldered directly to the printed circuit board or the switch can be inserted within a DIP socket similar to that shown in U.S. Pat. No. 4,060,296 to Kunkle, et al. which is soldered to the board. This latter practice enables a faulty switch to be replaced without the complexity of unsoldering the switch from the board.

Such a switch is shown in U.S. Pat. No. 4,454,391 to Olsson where the switch includes a plurality of leads extending outwardly from the body for interconnection to the printed circuit board. The fixed ends of the leads which extend into the housing are space apart a sufficient distance to prevent shorting therebetween. A spring metal slide is located between the two lead fixed ends and is moveable towards and away from, one of the lead fixed ends to connect and disconnect the two opposed leads.

One drawback to this switch design is that the cover is retained to the housing via an adhesive such as an epoxy. A drawback to epoxies in general is that they are difficult to maintain, that is the epoxies must be constantly monitored for proper combination of epoxy compounds, for the amount of air and contaminants in the epoxy, and the like. It is also difficult to control the epoxy in the process of manufacturing the assemblies, as the epoxies are quite fluid when first applied and tend to flow into the housing cavities. The epoxies must also be cured in an oven for approximately one hour which substantially increases the cycle time for each of the assemblies.

SUMMARY OF THE INVENTION

It is therefore an object of the instant invention to design a slide switch which can be assembled without the use of the epoxies.

It is further an object of the instant invention to substantially reduce the assembly time from previous epoxy assembled switches.

The above mentioned objects were accomplished by designing an electrical switch which comprises an insulative housing having a floor and walls upstanding from the floor to form an open upper face. An interior of the walls includes a channel which extends around at least a part of the periphery, and opens upwardly. An insulative cover member is profiled for receipt over the insulative housing and includes a lip which extends downwardly from the cover member for receipt within the channel, the lip and the channel having complementary surfaces which are in a noncontacting relation. The cover is ultrasonically welded to the housing, and the portion of the lip which contacts the floor is liquified, and the molten material flows within the channel and solidifies to retain the cover and the housing together.

In the preferred embodiment of the switch the dimension of the height of the lip is greater than the dimension of the depth of the channel, causing an upper surface of the cover to be raised above an upper surface of the housing by an offset distance, prior to the welding operation.

In the preferred embodiment of the invention a gap is formed between the complementary surfaces.

In the preferred embodiment of the invention the volume of the gap is greater than the volume of the lip to be melted.

A method of assembling the switch as mentioned above comprises the steps of applying pressure and vibration to the cover, causing the insulative material at the end of the lip to become molten and flow within the channel, and allowing the cover and housing to cool which solidifies the molten material, affixing the cover to the housing.

BRIEF DESCRIPTION OF THE DRAWINGS

FIG. 7A is a diagrammatical view showing the switch contact in the deactivated position.

FIG. 7B is a diagrammatical view similar to that of FIG. 7A showing the slide switch in the contacting and activated position.

FIG. 9 is a cross sectional view showing the mating profile of the cover and the housing.

FIG. 10 is a view similar to that of FIG. 9 showing the cover placed over the housing.

FIG. 11 is similar to that of FIG. 10 showing the connector assembly poised beneath an ultrasonic welding apparatus after the welding.

DETAILED DESCRIPTION OF THE PREFERRED EMBODIMENT

Figure 1:
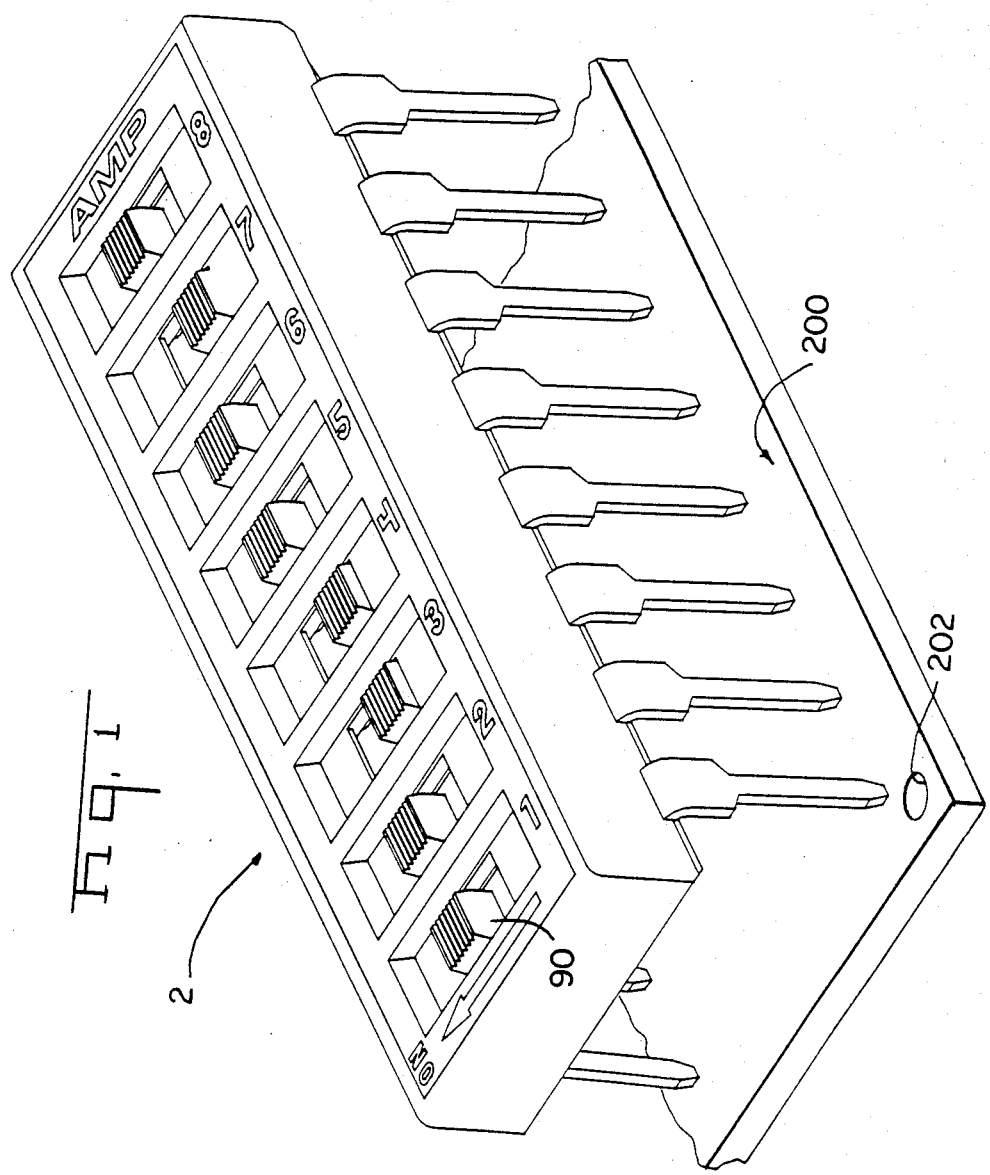
FIG. 1 is an isometric view showing the switch of the instant invention poised above a printed circuit board.
Figure 2:
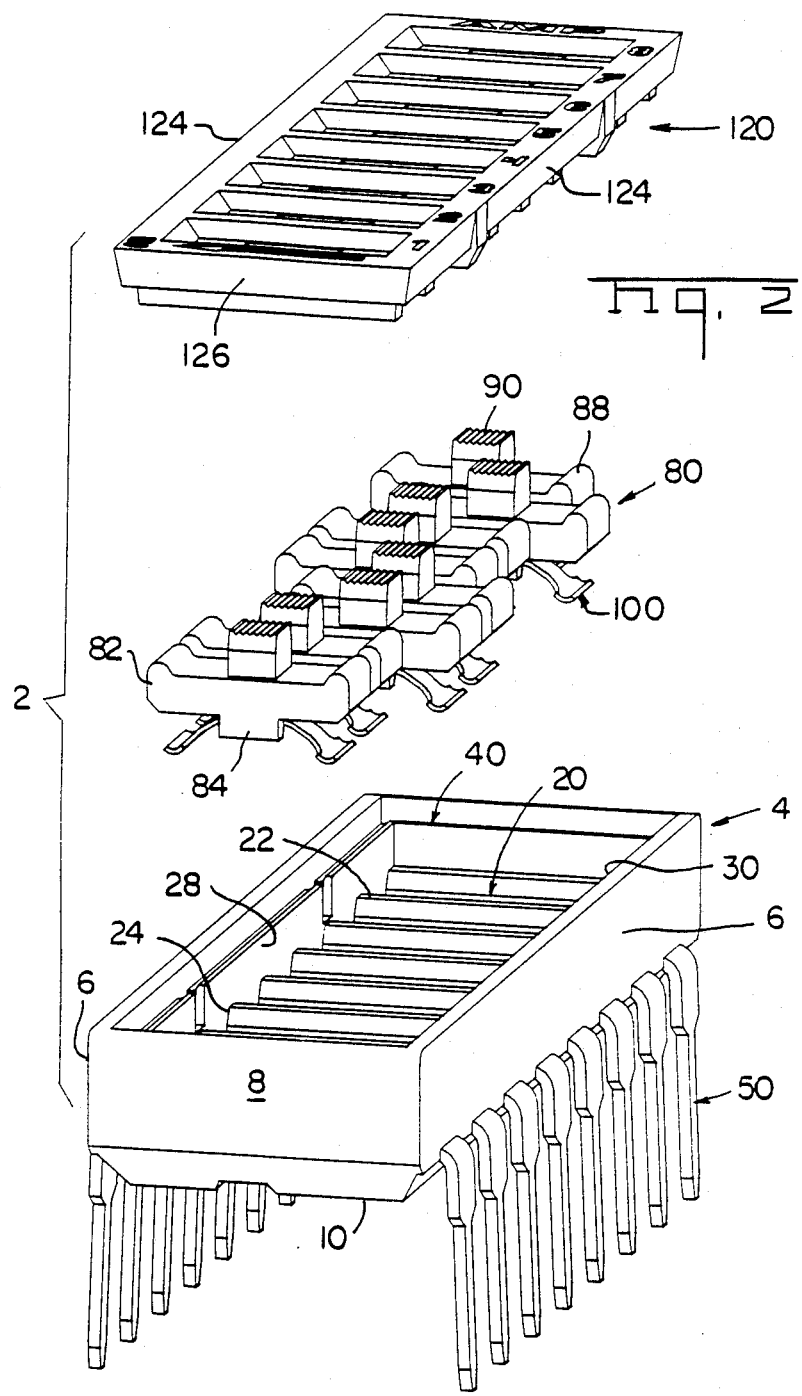
FIG. 2 is an isometric view showing the components of the assembly exploded away from each other.

With reference first to FIG. 1, the subject invention relates to a switch assembly 2 which is interconnectable with a printed circuit board, such as 200, which can be soldered in place and which contains a plurality of slide switch members 90 which can be placed in an activated or in a deactivated condition, thereby switching components into and out of an interconnected relationship on the printed circuit board. Reference to FIG. 2 shows the switch assembly as generally comprising a lower housing body, such as 4, a plurality of switch assemblies 80 and an upper cover, such as 120.

Figure 3:
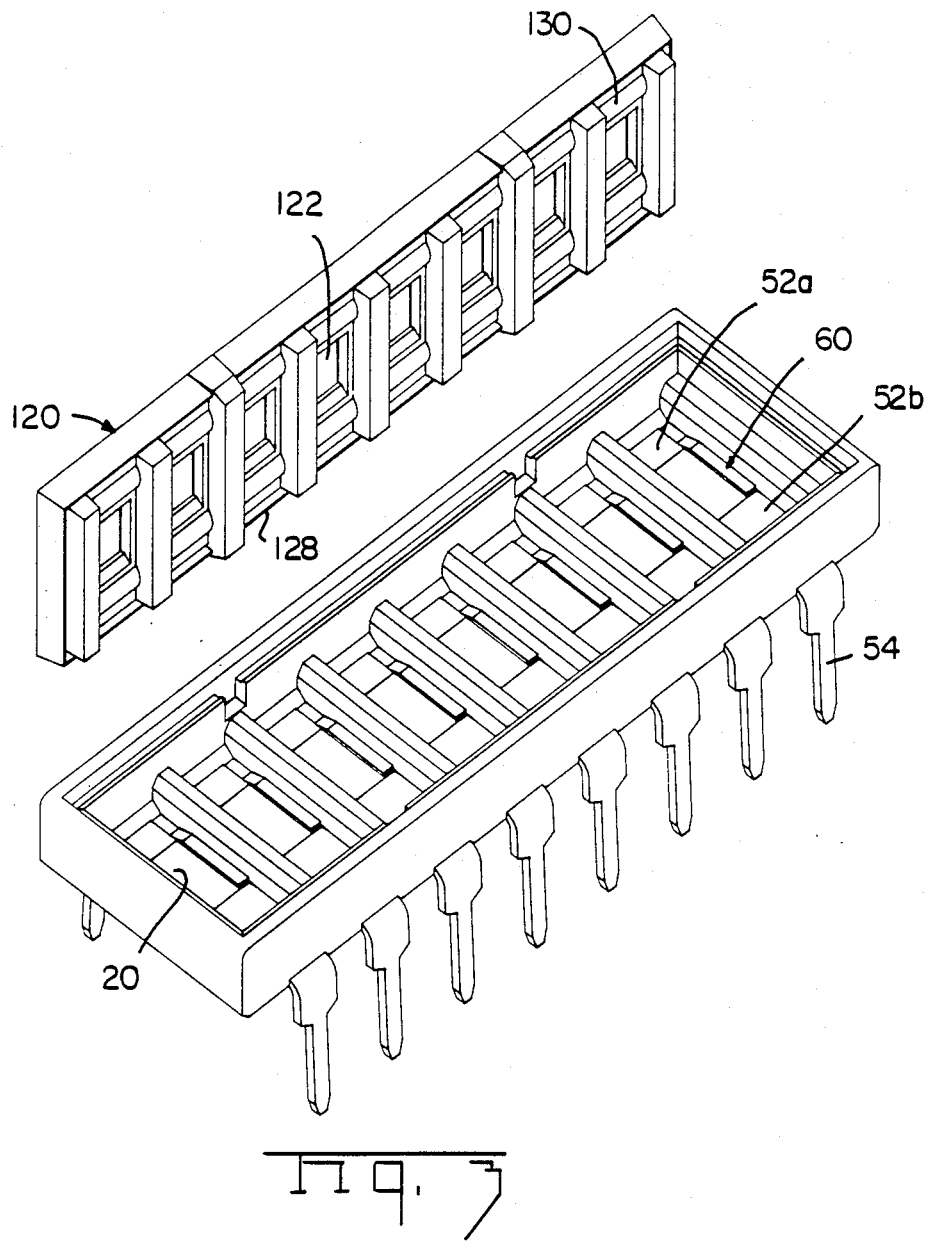
FIG. 3 is an isometric view showing the cover exploded away from the housing body, with the underside of the cover showing.
Figure 4:
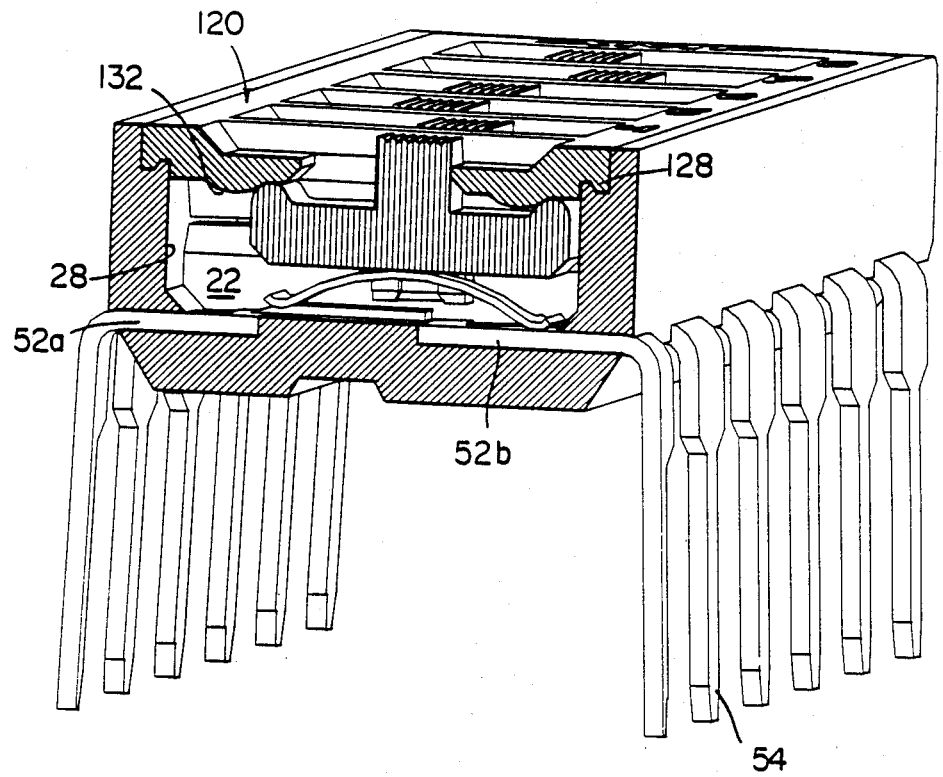
FIG. 4 is an isometric view showing the end of the switch partially cut away to show the inner components as finally assembled, and with the switch in the deactivated condition.
Figure 5:
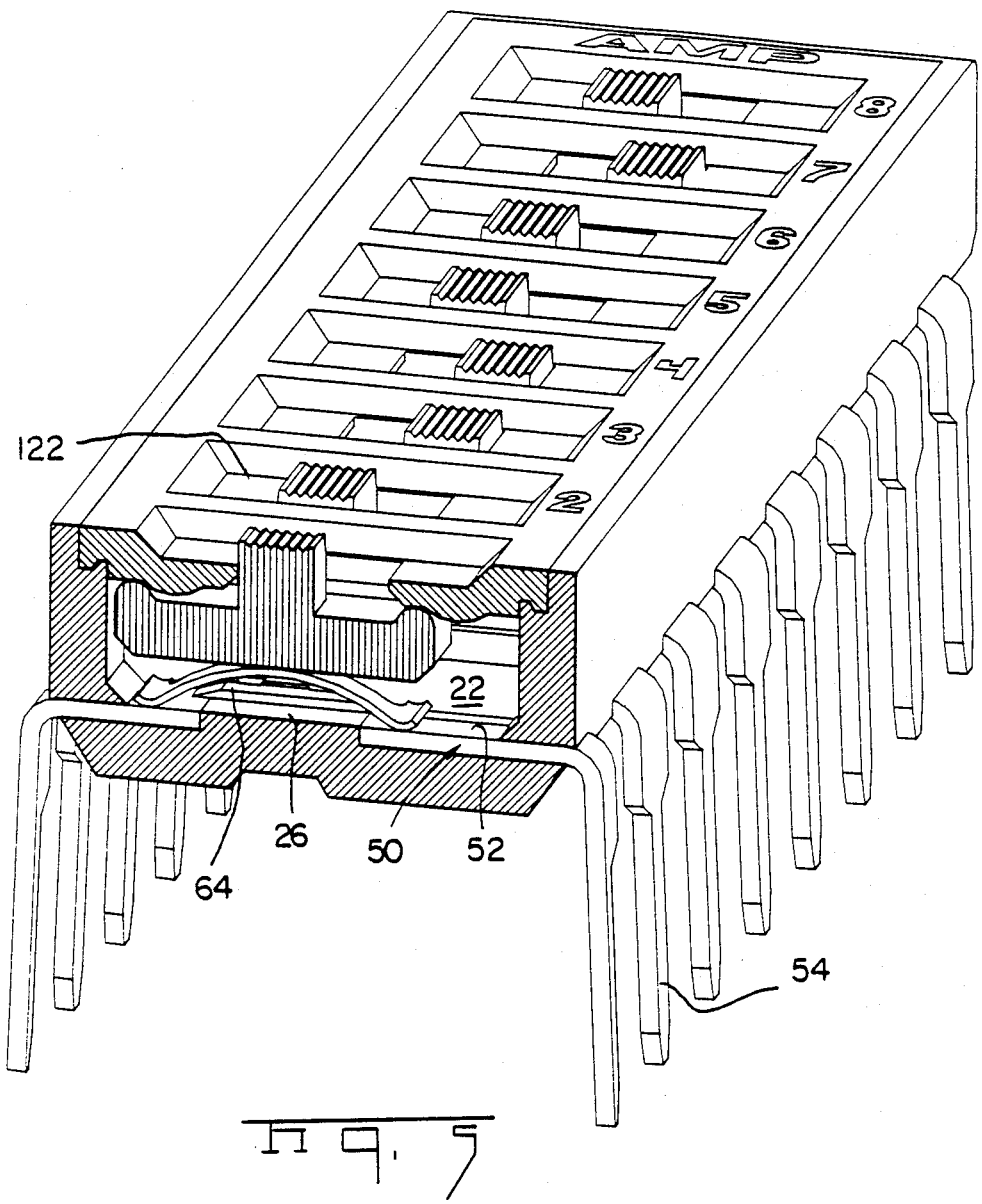
FIG. 5 is an isometric view similar to that of FIG. 4 showing the switch in the activated condition.
Figure 6A:
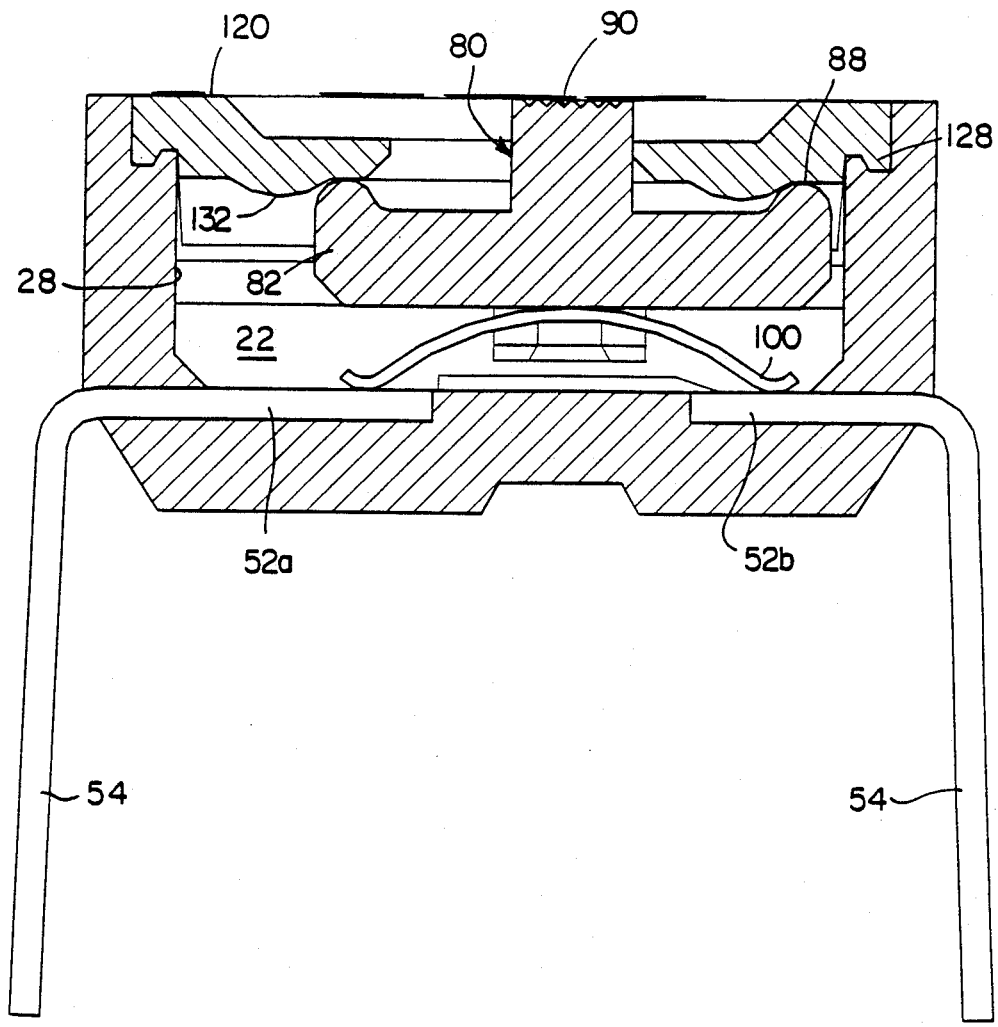
FIG. 6A is a cross-sectional view showing the slide switch in the activated position.
Figure 6B:
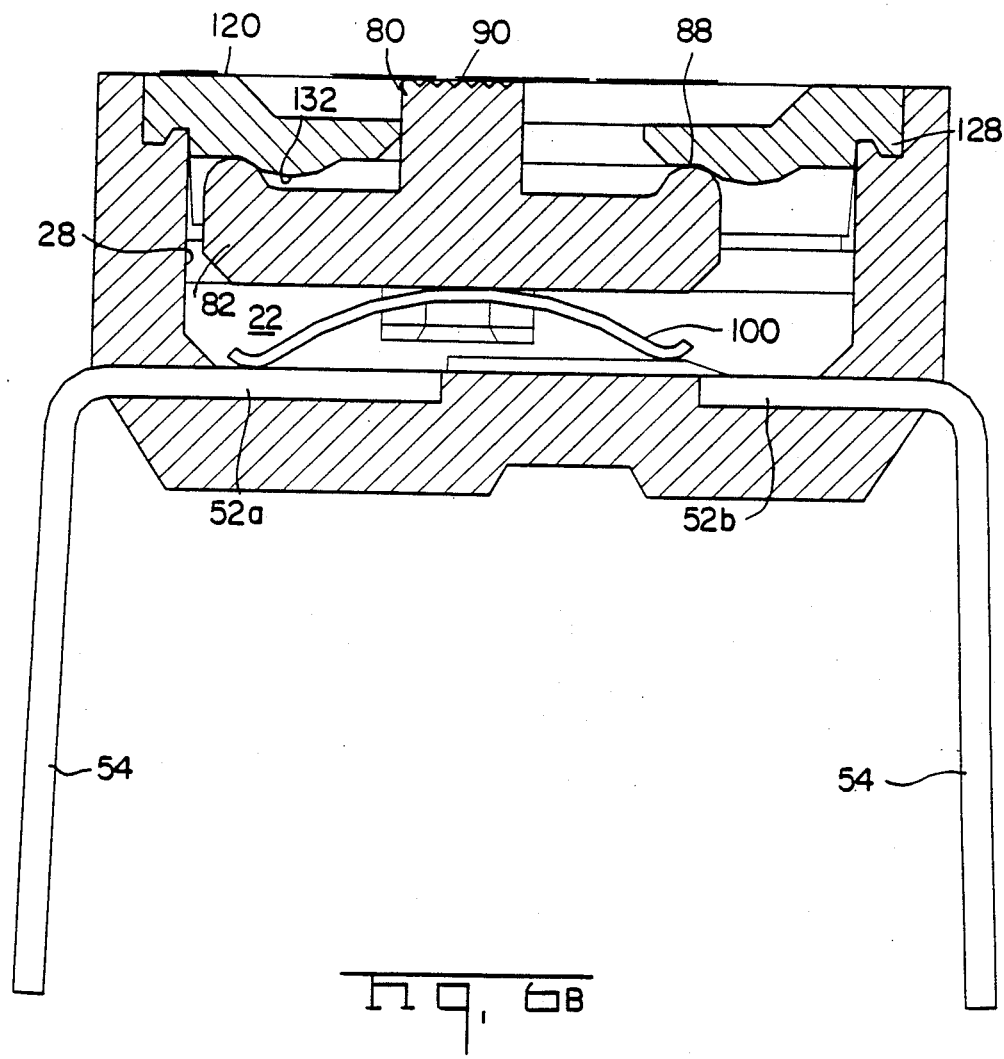
FIG. 6B is the cross-sectional view of FIG. 6A showing the slide switch in the deactivated position.

The lower housing 4 comprises an insulating material having a plurality of lead contacts 50 insert molded therein. The housing 4 generally includes side walls 6 having end walls 8 and a lower surface, such as 10. A plurality of walls, such as 22, define channels or compartments 20 between the walls for receipt of the slide switch members 80, the walls isolating the slide switch members one from the other. The inner surfaces 28, 30 of the side walls 6 include channels, such as 40, which extend around the periphery of the housing body and define a mating surface for the cover 120. As shown in FIGS. 3 and 4, the cover 120 includes a peripheral lip 128 around the edge of the cover 120 which cooperates with the channels.

The lead contacts are also shown in FIGS. 3 and 4 generally as 50 and include horizontal contact members, such as 52a and 52b, which are disposed within the channels 20 with a portion of the contacts extending outwardly from the side walls 6 and then bent downwardly into vertical lead portions 54. These vertical lead portions can either be directly interconnected to the printed circuit board through holes 202 or could be interconnected to a dual in-line package (DIP) socket as described above.

FIGS. 7A and 7B depict the internal structure of one of the compartments 20 of the lower housing assembly and show the fixed ends 52a and 52b being embedded within the floor 26 of the compartment 20. The surface of floor 26 is partially depressed below the surface of the fixed end 52a so that switching contact element 100 does not impinge upon the surface of floor 26. Two lead fixed ends are kept in an isolated manner by a span of plastic material between the two ends of the contacts, the portion of the plastic forming the floor 26 of the compartment. Two ramps or cams 60 flank the fixed ends 52a in front of fixed end 52b of the contacts 50 and include inclined portions 62 and horizontal portions 64. As shown in FIGS. 7A and 7B, the ramps 60 are spaced to positions laterally beyond the width of the fixed end 52a and in front of fixed end 52b of the leads. The camming aspect of the connector is more fully explained in copending patent application Ser. No. 179,603, now U.S. Pat. No. 4,841,105, concurrently filed.

Figure 8:
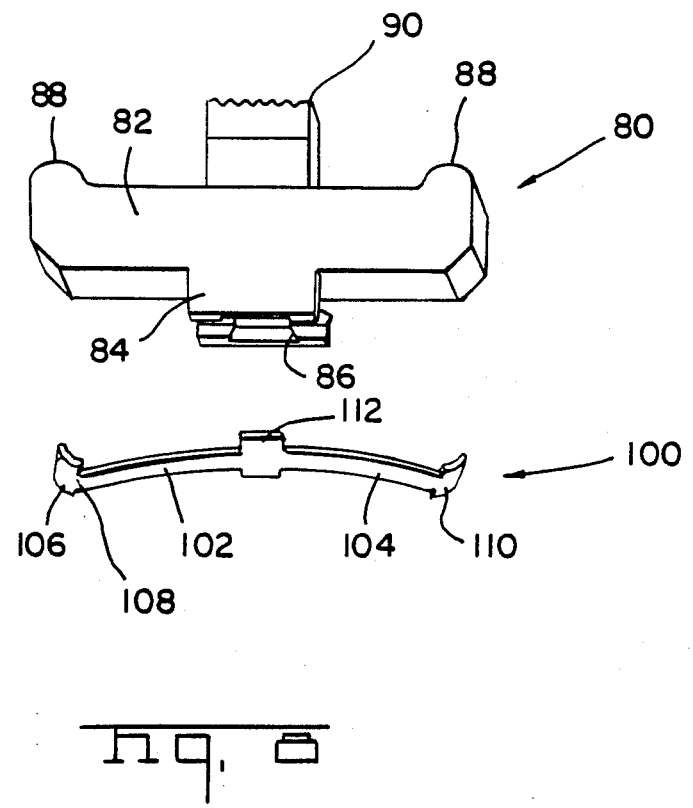
FIG. 8 is an isometric view showing the contact in an exploded manner away from the slide bar.

With reference now to FIG. 8, the slide switch assembly 80 is shown as including a horizontal slide bar 82 which includes two detent members 88 above the horizontal bar 82 with an intermediate switching button 90. Below the horizontal bar member 82 are two extensions or walls, such as 84, which form a channel to accept a retention member 112 of the slide switch element 100. The interior surface of the walls 84 includes a converging surface, such as 86. The switching contact element 100 generally includes two contact arms 102, 104 with contact elements 108, 110 at opposite ends of the arms. The end of contact arm 102 includes a T-shaped follower member 107 having tabs 106, as shown in FIGS. 7A and 7B. The follower member tabs 106 are profiled for mating engagement with the cam members 60.

With reference to FIGS. 2 and 3, the cover portion 120 is shown as including side edges 124 and end edges 126 with a plurality of elongate openings 122 extending through the upper and lower surfaces of the cover member 120. The upper cover 120 includes downwardly facing lips 128 which are profiled for cooperating with the channels 40 of the housing 4.

With reference to FIGS. 3 and 4, the under surface of the cover member 120 further comprises a plurality of detent members 130 which are interengageable with the detent members 88 on the slidable switch member 80.

To assemble the subject connector, the contact members 100 are placed within the slide switch members 80 such that the retention features 112 are frictionally fit within the converging surfaces 86. Each of the slide switch assemblies 80 are then inserted within associated channels 20 of the housing 4 and the upper cover 120 is placed over the insulating housing 4. Cover 120 is inserted over the housing 4 such that the lips 128 of the cover 120 are within the channels 40 of insulating housing member 4.

With reference to FIGS. 9 and 10, the mating profiles of the cover 120 and housing 4 are shown in greater detail. The lips 128 of the cover include surfaces 138, 140, 142, 144 which cooperate with surfaces 70, 73, 74 and 75, respectively. As shown in FIG. 9, surfaces 142 and 144 form a downwardly open channel on the cover 120 and surfaces 70, 73 and 74 form an upwardly open companion channel 40 on the insulative housing member. As shown in FIG. 10, the distance between surface 140 and 146, is slightly greater than the distance between surfaces 73 and 72 of the housing member 4. In the preferred embodiment of the invention, the distance "Y" is 0.010 inches, such that the top 146 of the cover is slightly higher than the top 72 of the housing. It should be noted that this profile allows for a small gap between the two surfaces 142 and 74.

As shown in FIG. 11, an ultrasonic horn is disposed above the cover 120 and the housing 4 in preparation for assembly. The cover and housing profile were specifically designed for use with the ultrasonic welding method. The end or tip 140 of the lip of the cover was made as narrow as possible such that the tip 140 was almost a point. As the ultrasonic welding method utilizes both pressure and vibration as a means to liquify the plastic into a molten material, the small tip 140 allows maximum energy transfer from the ultrasonic horn 300 to the tip 140. As vibration and pressure are applied to the cover 120 by the horn 300, the energy will transfer to the point of contact between the two members, 120 and 4.

As shown in FIG. 10, gaps A and B exist between the complementary surfaces of the lip 128 and channel 40. As the lip is so narrow at the tip, the tip will heat to the point of melting and the molten plastic material will flow upwards, in both directions, between the two surfaces 74 and 142, and between surfaces 70 and 138. As the floor of the cover is relatively massive compared to the tip 140, the floor 73 will not melt. The cover 120 will be forced downwards by the pressure of the horn, until the surface 146 of the cover 120 and the surface 72 are flush with each other. Thus the volume of material in the tip 140 to be melted is less the volume defined by the gap between surfaces 142 and 74 which will allow for the molten material to flow up surface 74 but not over surface 75 into the cavity. The surface 74 will prevent the molten plastic from flowing into the cavity portion of the switch housing 4 thereby adversely effecting the electrical connection between the switch contacts 100 and the leads 52a, 52b.

In the preferred method of manufacturing the connector, a 40 kilohertz horn is utilized, and it is anticipated that the welding process duration will be less than one second, probably in the neighborhood of one-half second. It is also anticipated that a 20 kilohertz horn would also weld the cover and housing together if the process duration was approximately one second.

In the preferred embodiment of the invention, the switch slide contact assemblies 80 must be installed prior to the welding of the cover 120 and housing 4, thus a pressure is exerted between the detents 88 and 132 when the ultrasonic horn is in place. In an effort to prevent the cover 120 and the slide switch assemblies 80 from also being welded together, the insulating portions which make up the slide switch assemblies 80 are made from a liquid crystal polymer (LCP), or equivalent high temperature material, which has a much higher melting temperature than the cover 120 and housing 4, while the cover 120 and housing 4 are made of a Nylon/PPO Alloy, or equivalent material. In the preferred embodiment of the invention, the LCP for the slide switch assembly 80 is loaded with approximately 30 percent glass, which will cause dissimilarities to the materials, preventing welding the slide switch assembly to the housing and/or cover.

In the preferred method of manufacturing the switch assemblies, the lead frames which make up the contact assemblies 50 are stamped and left in the blank stage. The lead frames are then transferred to a mold line where the housings 6 are molded over the lead frames. The switch assemblies 80 are then inserted within the respective channels within the housing, and the covers are ultrasonically welded in place. After the welding operation, the lead free ends 54 (FIG. 3) are formed downwardly to their final configuration. It has been found that forming the lead free ends after the welding operation prevents any damage to the leads during the welding operation.

The invention was described by way of the preferred embodiment but should not be taken to limit the scope of the invention.

We claim:
1. An electrical component comprising:
an insulative housing having a floor and walls upstanding from the floor to form an open upper face, an interior of the walls including a channel which extends around at least a part of a periphery of said housing, and opens upwardly, the walls defining a cavity surrounded by the channel;
an insulative cover member which is profiled for receipt over the insulative housing, the cover member including a peripheral lip which extends downwardly on the cover member for receipt within the upwardly open channel, the lip and the upwardly open channel having complementary surfaces, whereby
the cover and housing are ultrasonically welded together by the liquidification of the lip and the flowage and solidification of molten material therefrom within said channel, characterized in that the walls of the housing surround the insulative cover member when the insulative cover is ultrasonically welded to the housing, with an upper face of the housing walls being substantially flush with and surrounding an upper surface of the cover member and the cover has a downwardly open channel adjacent to and on the inside of the lip, the downwardly open channel receiving a rim on the housing adjacent to and on the inside of the channel, so that that portion of the lip rendered molten during ultrasonic welding remains in the two channels and does not flow into the cavity.

* * * * *